US012283163B2

(12) United States Patent
Cuddy et al.

(10) Patent No.: US 12,283,163 B2
(45) **Date of Patent: *Apr. 22, 2025**

(54) GAMING MACHINE AND METHOD FOR DISPLAYING AN EXPANDED PLURALITY OF ACTIVE SYMBOLS ON A MECHANICAL REEL

(71) Applicant: Aristocrat Technologies Australia Pty Limited, North Ryde (AU)

(72) Inventors: Ryan Cuddy, Reno, NV (US); Lyndsay Nelson Berger, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,394

(22) Filed: Jun. 30, 2023

(65) Prior Publication Data

US 2023/0343187 A1 Oct. 26, 2023

Related U.S. Application Data

(63) Continuation of application No. 17/190,211, filed on Mar. 2, 2021, now Pat. No. 11,735,011, which is a (Continued)

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC .......... *G07F 17/34* (2013.01); *G07F 17/3244* (2013.01); *G07F 17/326* (2013.01)

(58) Field of Classification Search
CPC .. G07F 17/3244; G07F 17/34; G07F 17/3213; G07F 17/3267
See application file for complete search history.

(56) References Cited

U.S. PATENT DOCUMENTS

| | | | | |
|---|---|---|---|---|
| 7,156,738 B2 | 1/2007 | Rowe | | |
| 8,602,868 B2 * | 12/2013 | Johnson | ............. | G07F 17/3213 463/20 |

(Continued)

OTHER PUBLICATIONS

Notice of Allowance dated Jan. 14, 2021 for U.S. Appl. No. 16/415,856 (pp. 1-5).

(Continued)

*Primary Examiner* — David L Lewis
*Assistant Examiner* — Eric M Thomas
(74) *Attorney, Agent, or Firm* — Armstrong Teasdale LLP

(57) ABSTRACT

An electronic gaming machine may include a plurality of mechanical reels, each of which may include a plurality of symbols, and a processor configured execute instructions stored on a memory. When the processor executes the instructions, the processor may control a first mechanical reel of the plurality of mechanical reels to spin and stop on a first stop position relative to a centerline, such that the first mechanical reel displays a first plurality of active symbols. The processor may execute the instructions to control a second mechanical reel of the plurality of mechanical reels to spin and stop on a second stop position relative to the centerline. The second stop position may be vertically offset from the first stop position, such that the second mechanical reel displays a second plurality of active symbols greater than the first plurality of active symbols displayed by the first mechanical reel.

20 Claims, 7 Drawing Sheets

Related U.S. Application Data continuation of application No. 16/415,856, filed on May 17, 2019, now Pat. No. 10,950,096.

(60) Provisional application No. 62/726,823, filed on Sep. 4, 2018.

(56) References Cited

U.S. PATENT DOCUMENTS

| | | | | |
|---|---|---|---|---|
| 9,595,157 | B2 | 3/2017 | Rasmussen | |
| 9,805,551 | B2 | 10/2017 | Meyer | |
| 9,836,925 | B2 | 12/2017 | Vann | |
| 9,959,703 | B2 | 5/2018 | Igesund | |
| 9,972,163 | B2 | 5/2018 | Hornik | |
| 10,115,266 | B2 | 10/2018 | Shaik | |
| 2015/0024827 | A1 * | 1/2015 | Schattauer | G07F 17/323<br>463/20 |
| 2016/0314661 | A1 | 10/2016 | Vann | |
| 2017/0032611 | A1 | 2/2017 | Luong | |
| 2017/0092043 | A1 * | 3/2017 | Shiraishi | G07F 17/3213 |
| 2018/0078854 | A1 | 3/2018 | Achmueller | |

OTHER PUBLICATIONS

Office Action dated May 29, 2020 for U.S. Appl. No. 16/415,856 (pp. 1-16).
Office Action (Non-Final Rejection) dated Dec. 7, 2022 for U.S. Appl. No. 17/190,211 (pp. 1-5).
Office Action (Notice of Allowance and Fees Due (PTOL-85)) dated Apr. 3, 2023 for U.S. Appl. No. 17/190,211 (pp. 1-7).

* cited by examiner

GAMING MACHINE AND METHOD FOR DISPLAYING AN EXPANDED PLURALITY OF ACTIVE SYMBOLS ON A MECHANICAL REEL

CROSS-REFERENCE TO RELATED APPLICATION

This application is a continuation of U.S. patent application Ser. No. 17/190,211, filed Mar. 2, 2021, which is a continuation of U.S. patent application Ser. No. 16/415,856, filed on May 17, 2019, which claims the benefit of U.S. Provisional Patent Application No. 62/726,823, filed on Sep. 4, 2018, the disclosures of which are hereby incorporated by reference in their entireties.

TECHNICAL FIELD

The field of disclosure relates generally to electronic gaming, and more particularly to an electronic gaming machine having at least one mechanical reel of a plurality of mechanical reels that rotates, during a bonus game, to include an expanded plurality of active symbols.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash-out button to receive a ticket from the ticket printer 222). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or pay-lines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of pay-lines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

BRIEF DESCRIPTION

In one aspect, an electronic gaming machine is provided. The electronic gaming machine may include a plurality of mechanical reels, each of which may include a plurality of symbols. The electronic gaming machine may also include a processor configured execute instructions stored on a memory. When the processor executes the instructions, the processor may control a first mechanical reel of the plurality of mechanical reels to spin and stop on a first stop position relative to a centerline, such that the first mechanical reel displays a first plurality of active symbols. In addition, the processor may execute the instructions to control a second mechanical reel of the plurality of mechanical reels to spin and stop on a second stop position relative to the centerline. In at least one embodiment, the second stop position may be vertically offset from the first stop position, such that the second mechanical reel displays a second plurality of active symbols greater than the first plurality of active symbols displayed by the first mechanical reel.

In another aspect, a method for presenting a wagering game on an electronic gaming machine is provided. The electronic gaming machine includes a plurality of mechanical reels, and each mechanical reel of the plurality of mechanically reels includes a plurality of symbols. The gaming machine also includes a processor, and the method includes controlling, by the processor, a first mechanical reel of the plurality of mechanical reels to spin and stop on a first stop position relative to a centerline, where the first mechanical reel displays a first plurality of active symbols. The method also includes controlling, by the processor, a second mechanical reel of the plurality of mechanical reels to spin and stop on a second stop position relative to the centerline, where the second stop position is offset from the first stop position during a feature game of the wagering game, and where the second mechanical reel displays a second plurality of active symbols greater than the first plurality of active symbols displayed by the first mechanical reel.

In yet another aspect, an article of manufacture is provided. The article includes a tangible, non-transitory, computer-readable storage medium having instructions stored thereon, which when executed by a processor, cause the processor to at least: control a first mechanical reel of the plurality of mechanical reels to spin and stop on a first stop position relative to a centerline, the first mechanical reel displaying a first plurality of active symbols; and control a second mechanical reel of the plurality of mechanical reels to spin and stop on a second stop position relative to the centerline, the second stop position offset from the first stop position, the second mechanical reel displaying a second plurality of active symbols greater than the first plurality of active symbols displayed by the first mechanical reel.

BRIEF DESCRIPTION OF THE DRAWINGS

An example embodiment of the subject matter disclosed will now be described with reference to the accompanying drawings.

DETAILED DESCRIPTION

Systems and methods for displaying an expanded plurality of active symbols on a mechanical reel are described. More particularly, a first plurality of symbols may be displayed from first plurality of stop positions selected during a bonus game. During a feature game triggered from the bonus game, at least one mechanical reel may be controlled to display a greater number of symbols from a greater number of stop positions. In general terms, this symbol expansion is accomplished by halting the at least one mechanical reel vertically offset from the other mechanical reels, giving a player looking at the reels (e.g., through a viewing window) an expanded or enlarged view of the symbols circumscribing the at least one reel. Stated another way, during the base game, a player may generally be presented an array of three reels, each having three active symbols (i.e., for a 3-3-3 array having 27 possible ways to win). During the feature game, the player may be presented an array of three reels, where at least one reel includes four active symbols (e.g., for a 3-4-3 array having 36 possible ways to win).

Figure 1:
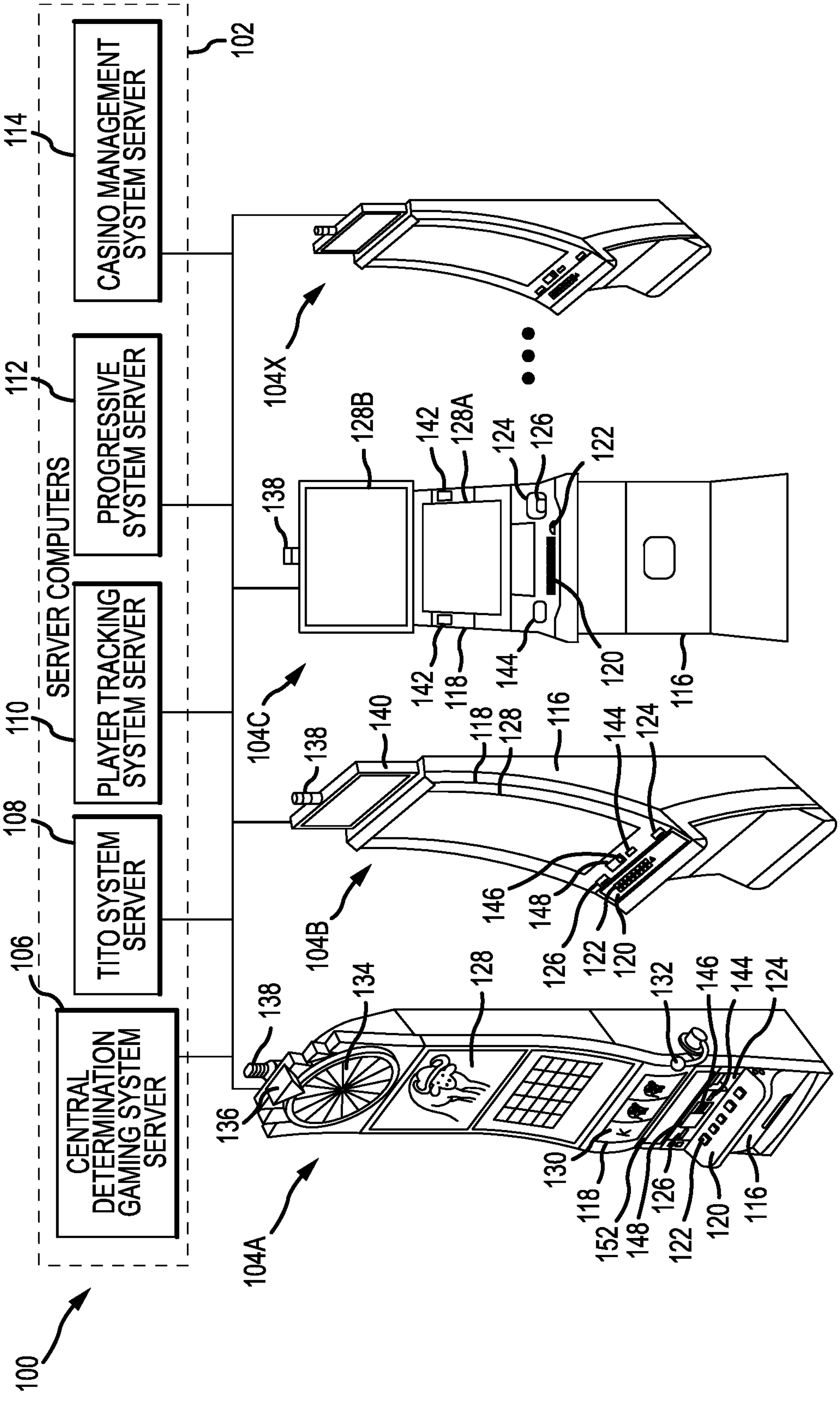
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
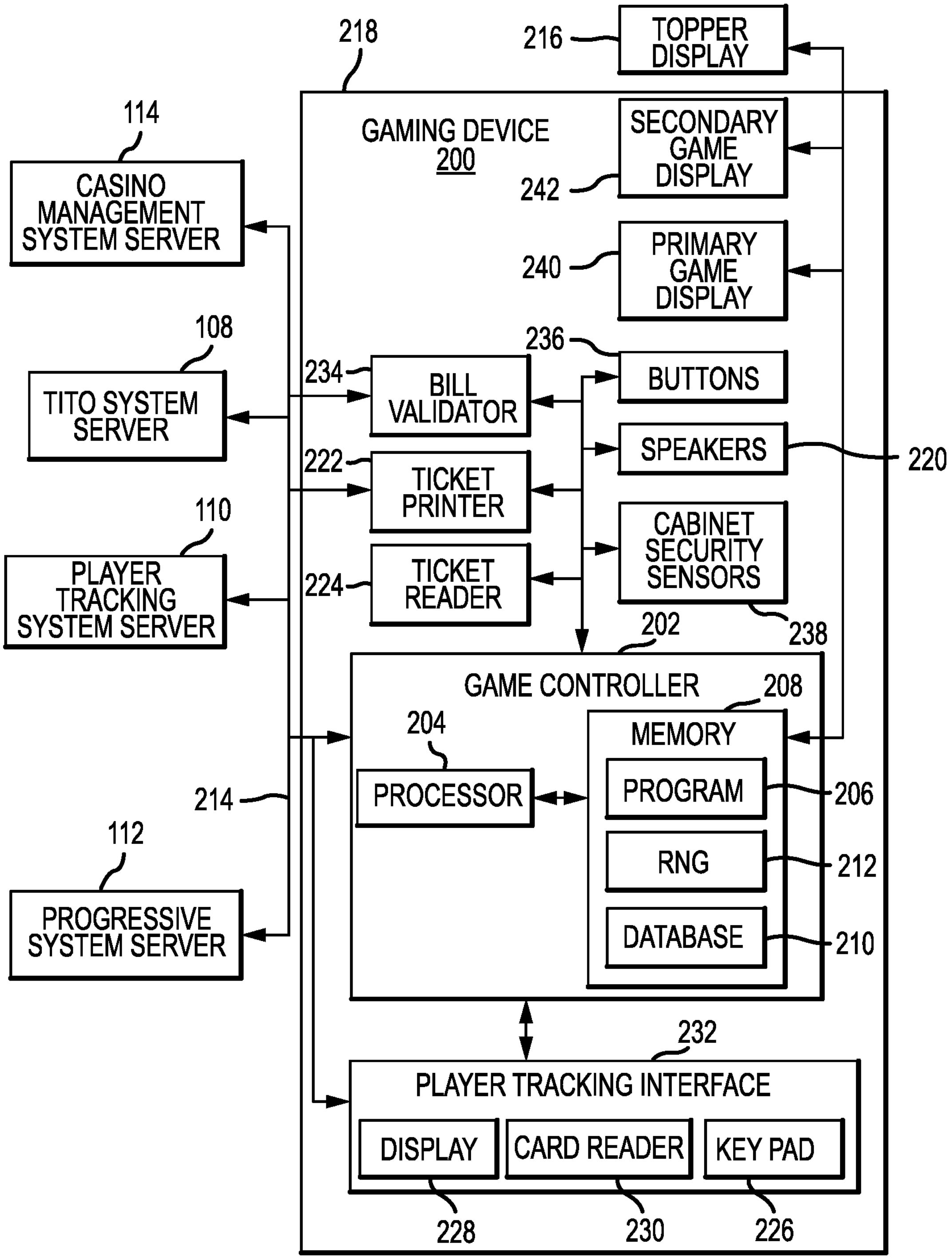
FIG. 2 is a block diagram showing various functional elements of an exemplary EGM as shown in FIG. 1.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay-lines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of mechanical reels and provide new technology in that they control the mechanical reels of an EGM to step the mechanical reels differently, such as, for example, to permit a display of one or more symbols circumscribing the mechanical reels at positions offset to their normal line positions and highlighted by backlighting to indicate an active status of the one or more symbols. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash-out button to receive a ticket from the ticket printer 222). The ticket may be "cashed-in" for money or inserted into another machine to establish a credit balance for play.

As described briefly above, any of EGMs 104A-104X may include a plurality of mechanical reels 130. Each mechanical reel may include a plurality of stop positions, and each stop position may, in turn, correspond to a symbol (or symbols) displayed on a circumference of the reel. In such an embodiment, game controller 202 may control the spinning and stopping of each mechanical reel of the plurality of mechanical reels 130, such as, for example, to ensure the each mechanical reel stops, after rotation, at a designated stop position. The designated stop position may, in turn, be selected by game controller 202 from a plurality of stop positions based upon a randomly determined game outcome.

For example, in the instance that reels 130 include a first reel, a second reel, and a third reel, a particular game outcome may specify that the first reel should be stopped at a first stop positon, that the second reel should be stopped at a second stop position, and that the third reel should be stopped at a third stop position. Game controller 202 may, as a result and based upon the game outcome, rotate each of the first, second, and third reels before stopping each reel at the first, second and third stop positions, respectively. This process may continue, such that reels 130 are re-spun and stopped at a variety of stop positions each time a new game outcome is determined.

To rotate each mechanical reel of the plurality of mechanical reels 130, in at least some embodiments, a stepper motor may be mechanically coupled to each reel (e.g., one stepper motor per reel). A stepper motor may, it will be appreciated, include a brushless DC electric motor capable of rotating three-hundred-and-sixty degrees about a motor axis. The stepper motor may, in addition, be coupled by a motor shaft (e.g., a motor shaft extending coaxially with a motor axis) to a respective reel of plurality of reels 130. The stepper motor may also include a plurality of step positions or "steps." During operation, stepper motor may be controlled by game controller 202 to rotate to, stop at, and/or hold any of the step positions or steps.

Further, some step positions or steps of the stepper motor may be arranged to correspond to a stop position of an associated mechanical reel, such that, during operation, the stepper motor is capable of moving or rotating the associated mechanical reel to a desired stop position using an associated step position. In some embodiments, and as described in additional detail below, a range of step positions or steps of a stepper motor (e.g., a range of nine or ten steps of a stepper motor) may correspond to a single stop position of a reel, where a center step of the range of steps may correspond to a center of an associated reel stop position.

Thus, a stepper motor may be mechanically coupled to each reel of the plurality of mechanical reels 130 and controlled to stop each reel (e.g., after rotating each reel) at a designated stop position, which may, as described herein, be selected based upon a randomly determined game outcome. Further, as described below, in at least some embodiments, the stepper motor may be configured to rotate at least one mechanical reel into a symbol alignment (or "line position") that is offset from the symbol alignment, or line position, of one or more other reels of plurality of reels 130.

Figure 3:
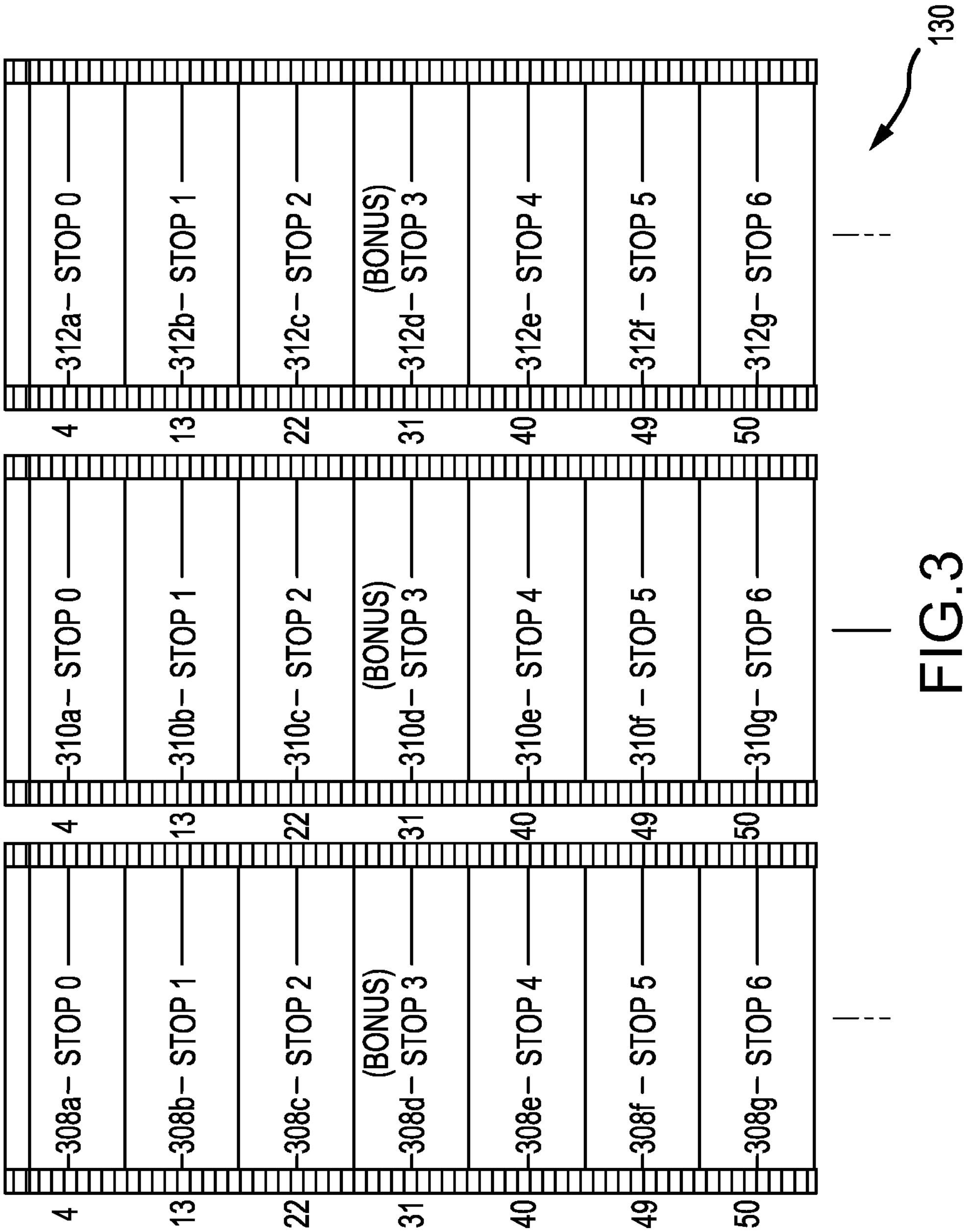
FIG. 3 is an illustration of an exemplary plurality of mechanical reels of an EGM, as shown at FIG. 1, in which each mechanical reel includes a plurality of stop positions mapped to a range of stepper motor steps or step positions.

To illustrate, FIG. 3 shows a portion 300 of a circumference of plurality of reels 130, where the circumference of each reel is laid flat for ease of understanding, and where each laid-flat circumference may be referred to herein as a "reel strip." In some embodiments, each reel strip may include a physical label or strip of material having a plurality of symbols displayed or printed thereon that attaches to an underlying mechanical reel. Here, however, symbols are not displayed. Rather, FIG. 3 illustrates a correspondence between a stop position of a reel and one or more step positions or steps of a stepper motor, as described more generally above.

Accordingly, the exemplary plurality of reels 130 includes a first mechanical reel 302, a second mechanical reel 304, and a third mechanical reel 306. Although three reels 302-306 are shown and described, it will be appreciated that any suitable number of mechanical reels may be implemented. In addition, as described above in FIG. 3, a portion of a circumference of each reel 302-306 is illustrated in a laid-flat or "reel strip" orientation to show a relationship between a stop position of each reel 302-306 and one or more step positions of a stepper motor coupled to and capable of controlling each reel 302-306. It will be appreciated, however, that reels 302-306 are cylindrical.

In the exemplary embodiment, a plurality of stop positions are included on first reel 302, where each stop position may include a symbol (not shown), and where first reel 302 may rotate and stop at any of the stop positions to display an associated symbol. Specifically, a first stop position 308*a*, a second stop position 308*b*, a third stop position 308*c*, a fourth stop position 308*d*, a fifth stop position 308*e*, a sixth stop position 308*f*, and a seventh stop position 308*g* are included on first reel 302. It will be appreciated, however, that first reel 302 may include any suitable number of stop positions. For example, a typical number of stop positions may range from approximately ten to thirty stop positions.

Likewise, a plurality of stop positions are included on second reel 304. As above, each stop position may include a symbol (not shown), and reels 304 and 306 may rotate and stop at any of the stop positions to display an associated symbol Specifically, a first stop position 310*a*, a second stop position 310*b*, a third stop position 310*c*, a fourth stop position 310*d*, a fifth stop position 310*e*, a sixth stop position 310*f*, and a seventh stop position 310*g* are included on second reel 304.

Third reel 306 may also include a plurality of stop positions, and each stop position may include a symbol (not shown), whereby first reel 302 may rotate and stop at any of the stop positions to display an associated symbol. In the example shown, these include a first stop position 312*a*, a second stop position 312*b*, a third stop position 312*c*, a fourth stop position 312*d*, a fifth stop position 312*e*, a sixth stop position 312*f*, and a seventh stop position 312*g* Like first reel 302, second reel 304 and third reel 306 may include any suitable number of stop positions.

As also shown, some of the stop positions 308-312 may correspond to a "BONUS" position. In the illustrative example, stop positions 308*d*, 310*d*, and 312*d* are BONUS positions; however, any stop position of any reel 302-306 may correspond to a BONUS position. Functionally, a BONUS position may be selected by a processor or game controller, as described herein, to trigger a bonus or feature game.

In addition, each stop position 308*a*-308*g*, 310*a*-310*g*, and 312-*a*-312*g* of each reel 302-306 is associated with or corresponds to at least one step position (or step) of a stepper motor mechanically coupled to and configured to control rotation of the associated reel 302-306. In the example of FIG. 3, first stop positions 308*a*, 310*a*, and 312*a* (or "Stop 0" of each reel 302-306) correspond to a step position in the range of "1-9." Stop positions 308*a*-312*a* are, more particularly, centered on step position "4." Likewise, second stop positions 308*b*, 310*b*, and 312*b* (or "Stop 1" of each reel 302-306) correspond to a step position in the next consecutive range "10-18," (e.g., center step position "13"), and so on through each of the stop positions 308-312 of each reel 302-306.

Thus, during operation, a stepper motor can move or rotate an associated mechanical reel 302-306 to a desired stop position (e.g., "Stop 0," "Stop 1," etc.) using an associated step position (e.g., step position "4," step position "13," etc.) As described in greater detail herein, where a plurality of stop positions (including their associated symbols) are to be displayed, a stepper motor may be stopped or halted on a center step position associated with a stop position to be displayed within a center position of a viewing window, whereby one or more stop positions above and/or below the selected center stop position are also viewable within the viewing window, depending, for example, upon the size or dimensions of the viewing window.

Accordingly, as reels 302-306 are rotated and stopped, several symbols from each reel of the plurality of reels 130 may be selected, such as, for example, by appearing through a viewing window of an EGM 104A-104X. The symbols selected from each reel of the plurality of reels 130 may be regarded as "active," in that each of these symbols are capable of combination with symbols displayed from the other reels of the plurality of mechanical reels 130 to produce a "pay-line." Likewise, a symbol that is not selected for combination on a pay-line, but which may be at least partially visible to a player after reels 130 have stopped, may be regarded as "inactive." In some cases, backlighting may also be used, as described herein, to designate active symbols. Similarly, in at least some embodiments, an "inactive" symbol may simply be unilluminated by the backlighting.

As used herein, a "pay-line" may also be referred to as a "betting line" or a "way to win," and may generally refer to any combination of symbols, one from each reel, displayed, left-to-right, across the plurality of mechanical reels 130. It will be appreciated that pay-lines may run, in at least some embodiments, through all possible left-to-right combinations of symbols displayed across each of the plurality of reels 130.

For example, in a three reel game in which each reel includes three active symbols (e.g., three symbols generally displayed within a viewing window or illuminated), a total of twenty-seven pay-lines (e.g., 3*3*3) may be defined. However, in other embodiments, only a subset of pay-lines may be available to a player, such as, for example, based upon a wager amount placed by the player (e.g., where larger wagers make larger numbers of pay-lines available and where smaller wagers reduce the number of available pay-lines). Similarly, as described below, in a three reel game that includes three active symbols from a first reel, four active symbols from a second reel, and three active symbols from a third reel, a total of thirty-six pay-lines (e.g., 3*4*3) may be defined.

Figure 4:
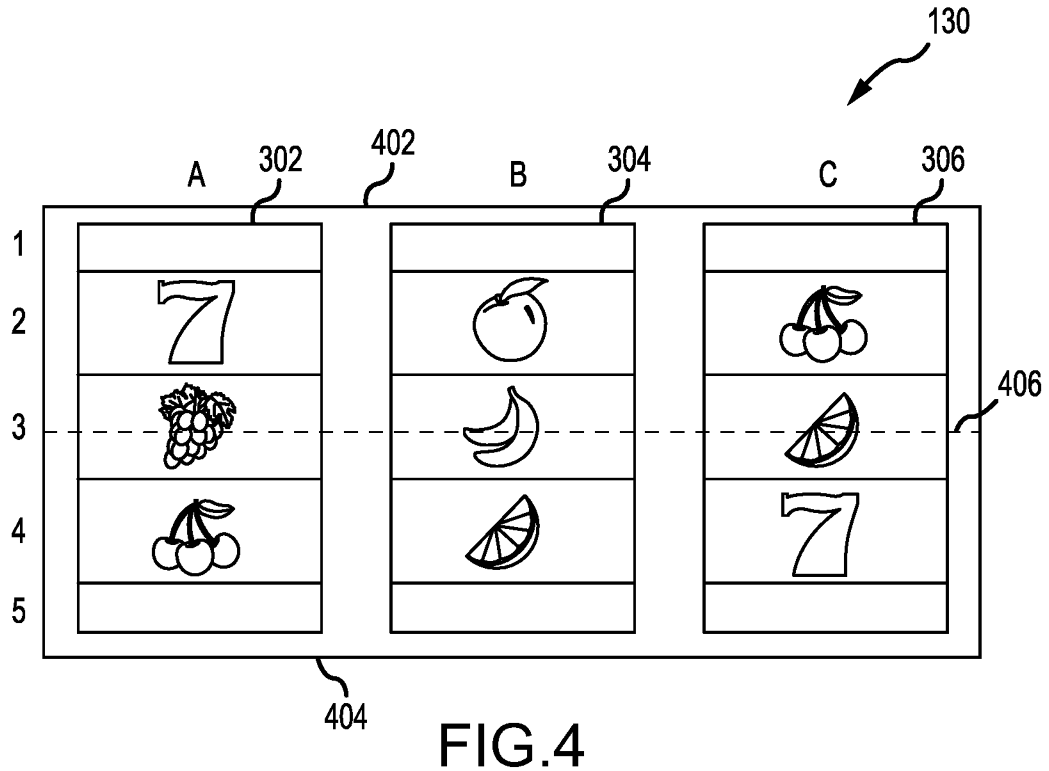
FIG. 4 is an illustration of an exemplary plurality of mechanical reels of an EGM, as shown at FIG. 1, in which the plurality of mechanical reels of the EGM are stopped in a first alignment or position.

FIG. 4 is a front view of reels 302-306 as displayed on an EGM 104A-104X and including symbols on each stop position 308-312. Specifically, first reel 302, second reel 304, and a third reel 306 are illustrated in stopped positions. Each reel 302-306 displays, while in a respective stopped position, a plurality of symbols, some of which are active (e.g., available for combination on a pay-line), and some of which are inactive (e.g., unavailable for combination on a pay-line), as described above.

As described above, each of reels 302-306 may be spun and subsequently stopped at a respective stop position 308-312. In at least some embodiments, in a stop position 308-312, a first number of symbols (e.g., three symbols) may be displayed in their entirety from each of reels 302-306, and a second number of symbols (e.g., two symbols) may be only partially displayed from each of reels 302-306. More particularly, the circumference or curvature of each reel 302-306 may be such that, in at least some embodiments, a total of three symbols are fully visible, while a remaining two symbols extend, or appear to extend, at least partially, over a visible edge, such as an upper edge 402 and a lower edge 404, respectively, of each reel 302-306. Likewise, a viewing window, as described herein, may define edges 402 and 404 (e.g., rather than or in addition to a curvature of reels 302-306).

Moreover, in some embodiments, symbols may simply be selected or designated as "active," such as, for example, by illuminating the symbols. In other words, although one or more symbols may or may not extend over an edge 402 or 404, as described above, symbols may simply be designated or identified as active by illuminating the symbols. Unilluminated symbols, whatever their position relative to edges 402 and 404, may be regarded as inactive.

Furthermore, although symbols are described herein as being visible and extending or disappearing over an edge of a reel 302-306, it will be appreciated that these terms are generally dependent upon a player perspective or viewpoint (e.g., symbols may variously come into view and/or disappear from view as a player's perspective on each mechanical reel 302-306 shifts). In short, however, when a player is seated or standing in front of reels 302-306, the player may generally see three symbols in full view and two symbols, extending over the upper edge 402 and lower edge 404, in partial view. In other embodiments (e.g., depending on symbol sizes) greater or fewer numbers of symbols may be displayed in full view and/or greater or fewer numbers of symbols may be displayed in partial view.

To determine where to stop a reel 302-306, processor 204 (e.g., of game controller 202) may obtain (or "pull") a random number from a random number generator, such as RNG 212. The random number may be compared to a plurality of predefined ranges of random numbers, each of which may be mapped to a particular reel stop 308-312. Table 1 below is illustrative. However, it will be appreciated that a typical game may map a much larger range of random numbers to a larger range of reel stop positions 308-312 and/or step positions.

TABLE 1

| RNG Range | Stop Position of Reel | Step of Stepper Motor |
|---|---|---|
| 0-5 | Stop 0 | 4 |
| 6-10 | Stop 1 | 13 |
| 11-15 | Stop 3 | 22 |
| 16-20 | Stop 4 | 31 |
| 21-25 | Stop 5 | 40 |
| 26-30 | Stop 6 | 49 |
| 31-35 | Stop 7 | 58 |

Accordingly, if processor 204 obtains a random number in the range of 0-5, processor 204 may determine that the associated reel stop position for at least one of reels 302-306 (or all reels, depending upon game implementation) is Stop 0. Likewise, if processor 204 pulls a random number in the range 6-10, processor 204 may determine that an associated reel stop position is Stop 1, and so on. Further, to halt a reel 302-306 at a determined stop position, processor 204 may obtain a step or step position of the stepper motor that controls an associated reel 302-306 from the third column of Table 1. In this example, if processor 204 determines that reel 302 should be stopped at Stop 0, processor may provide a control instruction, using Table 1, to the stepper motor for reel 302 that controls reel 302 to halt or stop at step position 4. The same process applies to the remaining stop positions and steps in Table 1.

In addition, as described in greater detail below, in at least some embodiments (e.g., during a bonus or feature game), one or more reels 302-306 may be configured to rotate into a stop position that offsets a symbol alignment of the one or more reels 302-306 from one or more other reels 302-306, such that the one or more offset reels 302-306 display a greater number of active symbols. For example, in at least one embodiment, center reel 304 may be configured, during a bonus or feature game, to rotate into a symbol alignment or stop position that is offset from the symbol alignments or stop positions of reels 302 and 306, such that an additional fourth symbol becomes active on center reel 304.

To illustrate, the symbols displayed from each reel 302-306 may, together, define a matrix of symbols. Each symbol may be designated by a position identifier comprising a row number (e.g., "1," "2," "3," "4," "5," etc.) and a column letter (e.g., "A," "B," "C," etc.), where each column letter may correspond, in at least the exemplary embodiment, to a respective reel 302-306. For example, the upper-left-most symbol, occurring on reel 302 at the intersection of row 1 and column A, may be designated by the position identifier "1A."

In addition, a centerline 406 may be defined relative to the visible portion of each reel 302-306. Specifically, centerline 406 may extend substantially through a center portion of the visible portion of each reel, irrespective of the alignment or line position, as described below, of each reel 302-306. In some embodiments, each reel 302-306 may be visible through a viewing window, which may limit the visible portion of each reel 302-306, and which may define upper edge 402 and lower edge 404. Likewise, as described above, a visible portion of each reel 302-306 may be limited by the curvature of each reel 302-306. Where a viewing window is included, centerline 406 may extend substantially through a center of the viewing window midway between and parallel to edges 402 and 404.

During gameplay, symbols may be initially displayed from reels 302-306 during a base (or primary) game using a mapping similar to the example mapping shown and described above with reference to Table 1, which may be initiated in response to a wager placed by a player (e.g., via a spin or bet button of the EGM 104A-104X). For example, and with continuing reference to FIG. 4, a 3-by-3 matrix of active symbols may be displayed from each of reels 302-306. In the active matrix, the symbols at rows 2-4 may be active (e.g., available for combination with other active symbols on a pay-line), while the symbols at rows 1 and 5 may be inactive (e.g., unavailable for combination with other symbols on a pay-line). In some embodiments, as described above, the symbols at rows 1 and 5 may extend at least partially over or beyond an edge 402 or 404. However, in other embodiments, the symbols at rows 1 and 5 may simply be unilluminated to indicate that they are inactive.

Moreover, in the 3×3 active matrix, centerline 406 may extend through a center of each symbol at row 3. In other words, during the base game, reels 302-306 may be stopped, after being spun, such that the symbols forming the active matrix are aligned with one another across all three reels 302-306. As a result, centerline 406 may extend substantially through a center portion of each symbol (and thus each corresponding stop position 308-312) from each reel 302-306 displayed at row 3.

For example, if "Stop 2" (or 308_c_-312_c_) is selected during a spin of reels 302-306, processor 204 may control the stepper motor of each reel 302-306 to halt at step 22 (corresponding to a center position of Stop 2, as shown with reference to FIG. 3). Further, as shown, the symbols displayed from reels 302-306 may be in substantial alignment. Stated another way, a "line position" of each row 1, 2, 3, 4, and 5, may not vary from one reel to the next. Rather, symbols from each reel 302-306 may be aligned across all reels 302-306.

During play of the base game, a player may be awarded a win condition corresponding to a feature or bonus game. It will be appreciated that any of a variety of win conditions may trigger a bonus game. For example, in at least one embodiment, a predefined combination of symbols occurring in the active matrix may trigger a feature or bonus game. In another embodiment, a feature or bonus game may be randomly triggered and/or triggered in response to a total coin-in, etc. In some embodiments, if a reel 302-306 (or combination of reels 302-306) is stopped at a stop position (e.g., Stop 3) corresponding, as shown at FIG. 3, to a BONUS trigger, a bonus or feature game may be triggered or initiated by processor 204.

Figure 5:
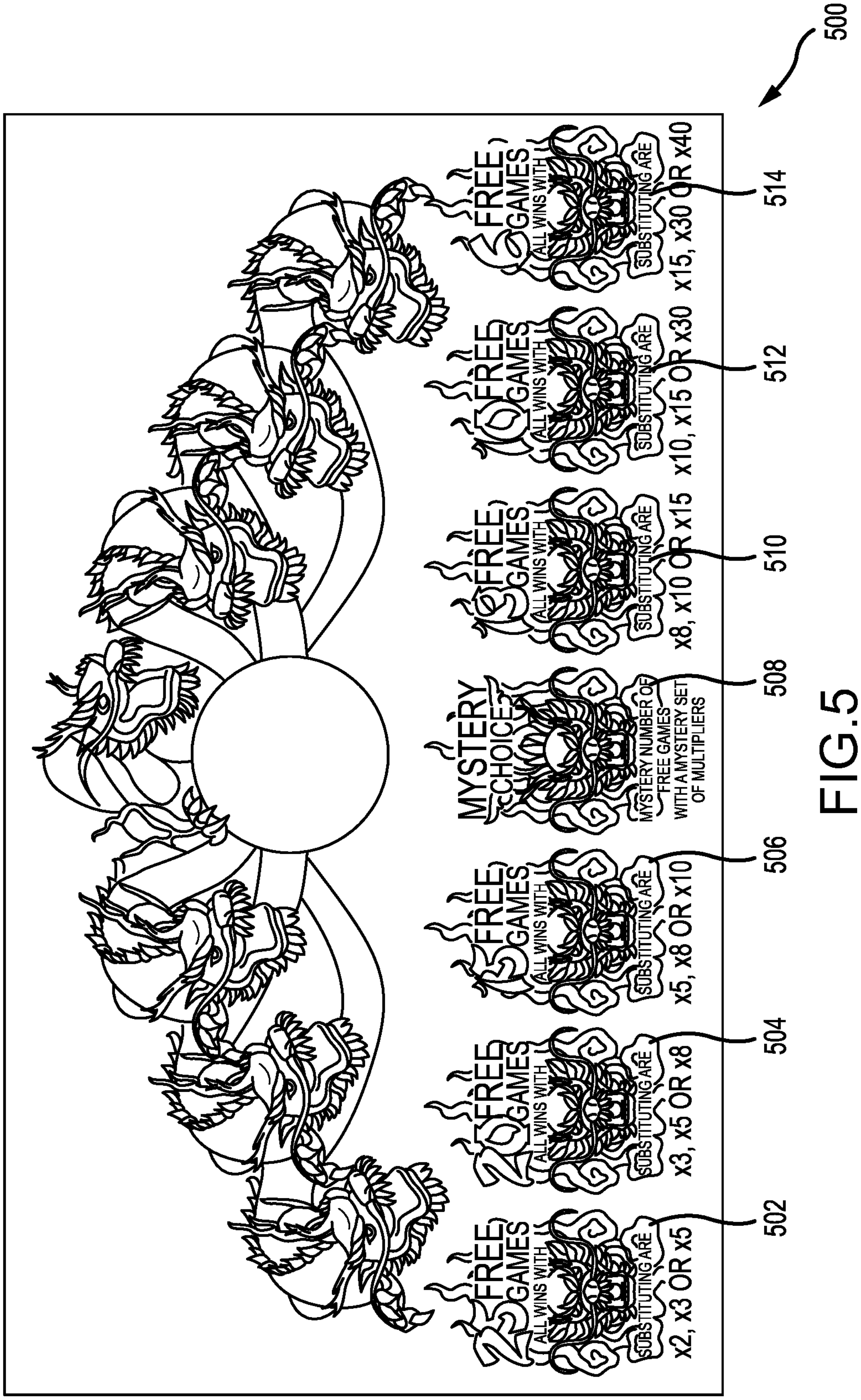
FIG. 5 is an illustration of an exemplary feature game selection screen triggered from a base game played on the plurality of mechanical reels of the EGM shown at FIG. 1.

FIG. 5 is an illustration of an exemplary feature game selection screen 500 triggered from a base game played on the plurality of mechanical reels 130 of an EGM 104A-104X. As described herein, a bonus or feature game may be triggered or initiated in response to a variety of trigger conditions or symbol combinations occurring during a base game. In the exemplary embodiment, if one or more of reels 302-306 is stopped and displays a BONUS trigger symbol, a feature game may be initiated.

In response to initiation of a feature game, feature game selection screen 500 may be displayed by processor 204 on a display device of an EGM 104A-104X that triggered or initiated the feature game, such as on primary game display 240, secondary game display 242, topper display 216, and/or player tracking interface display 228. As shown, a plurality of feature game options may be provided. In the example of FIG. 5, there are seven feature game options available for player selection. These include a first feature game option 502, a second feature game option 504, a third feature game option 506, a fourth feature game option 508, a fifth feature game option 510, a sixth feature game option 512, and a seventh feature game option 514. Although seven feature game options 502-514 are shown, it will be appreciated that any suitable number of feature game options may be provided.

Each feature game option 502-514 is player selectable (e.g., using a touchscreen portion of the display device and/or a mechanical pushbutton arranged to select a corresponding feature game option 502-514. In addition, each feature game option 502-514 may specify a number of free games (or free spins of reels 302-306) to be provided a player during play of the selected feature game and one or more credit multipliers which will be made available and/or awarded during play of the selected feature game.

As shown, a "volatility" of feature game options 502-514 may vary from one feature game option 502-514 to the next, where, as used herein, a "volatility" of a feature game may refer to a number of free games provided during the feature game and the credit multipliers used or made available during the feature game. Specifically, a volatility of a feature game may be regarded as increasing (or simply "more volatile") where there are fewer free games provided but where the credit multipliers are also increased or greater. Likewise, a lower volatility feature game may award a greater number of spins in association with smaller credit multipliers. In the example of FIG. 3, feature game option 502 represents a lowest volatility option (25 free games and ×2, ×3, and ×5 credit multipliers), while feature game option 514 represents a highest volatility option (6 free games with ×15, ×30, and ×40 credit multipliers).

Figure 6:
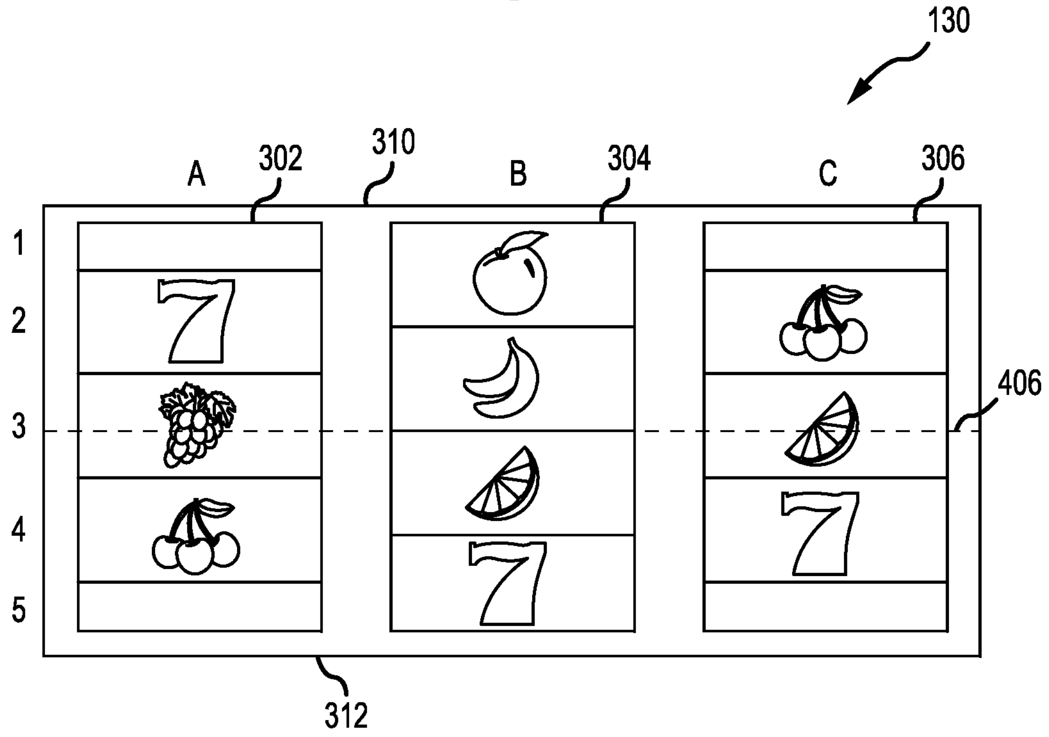
FIG. 6 is an illustration of the exemplary plurality of mechanical reels shown at FIG. 1, during a feature game, in which a center reel of the plurality of mechanical reels in stopped in a second alignment or position, different from the first alignment or position, and in which the center reel includes an expanded number of active symbols.

FIG. 6 is an illustration of reels 302-306, in stopped positions, during a feature or bonus game, as triggered from the base game, and as described above. In the exemplary embodiment, and as described more briefly above, the active matrix of symbols may expand during the bonus game, such that one or more reels are rotated into symbol alignments or stop positions offset from the symbol alignments or stop positions of one or more other reels.

More particularly, in at least the exemplary embodiment, center reel 304 may be rotated into a symbol alignment or stop position that is offset from the symbol alignments or stop positions of reels 302 and 306, which may retain their symbol alignments from the base game (although they may be re-spun during the bonus game). Specifically, and as shown, center reel 304 may be stopped, such that centerline 406 does not extend through a central portion the symbol at position indicator "3B," as in the base game, but between two symbols, such as, for example, the symbols at position indicators "3B" and "4B" or between the symbols at position indicators "3B" and "2B."

Stated another way, if reel 302 and reel 306 (i.e., the left and right reels) are rotated into a stop position, such as Stop 3 (see FIG. 3), processor 204 may select a step or step position "31" for each reel 302 and 306. However, for center reel 304, processor 204 may select an offset step position (e.g., half a step up or down), such as step position "27" or step position "35", where step position "27" corresponds to a top edge of Stop 3 and step position "35" corresponds to a bottom edge of Stop 3. As a result, centerline 406 may not pass through a center portion of Stop 3 on reel 304 (as with reels 302 and 306) but through or parallel with an edge (top or bottom) of Stop 3.

Thus, in at least one embodiment, a stepper motor of reel 304 may be controlled by game controller 202 to move reel 304 half a step up, such that the edge between the selected symbols (e.g., the symbols at position indicators "3B" and "4B") is aligned with centerline 406. Likewise, in at least some embodiments, the stepper motor of reel 304 may be controlled by game controller 202 to move reel 304 half a step down, such that the edge between selected symbols (e.g., the symbols at position indicators ""3B" and "2B") is aligned with centerline 314.

Accordingly, during the bonus game, the symbols (and selected stop position) of center reel 304 may, when reels 302-306 are stopped, be incrementally out of alignment with the symbols (and selected stop positions) of reels 302 and 306. Specifically, the symbol alignment of reels 302 and 306 may be aligned, while the symbol alignment of reel 304 may be incrementally above or below the symbol alignment of reels 302 and 306. Further, the increment by which reel 304 is adjusted may correspond to a distance of half a step or step position of the stepper motor for reel 304.

As a result, an expanded matrix of active symbols may be provided to a player during play of a bonus game. For example, during the bonus game, the symbols at rows 2-4 may be active on reels 302 and 306, while the symbols at rows 1-4 or rows 2-5 (depending upon the direction of the incremental adjustment, as described above) may be active on reel 304. In either instance, however, the effect of the incremental adjustment is to increase the size of the active matrix by an additional row at center reel 304, such that the active matrix in the bonus game includes thirty-six possible pay-lines.

Although center reel 304 is generally described herein as being the reel capable of stopping at a half step to create an expanded array of symbol positions during a feature game, it will be appreciated that in other embodiments, any and/or all reels 302-306 may be stopped at half step positions to different numbers of active symbols (and pay lines) during game play. For example, in at least one embodiment, reels 302 and 306 may be stopped at half step positions, while center reel 304 may be stopped at a regular or full step position. In this embodiment, reels 302 and 306 would include four active symbols, while reel 304 would include three active symbols, for a total of 48 pay lines. In another embodiment, all reels 302-306 may be stopped at a half step to create a 4×3 expanded array of symbols, which would, as described herein, define 64 pay lines. In another embodiment, the reel expansion may be used or implemented with a base game and would not be limited to implementation during a feature or bonus game.

Figure 7:
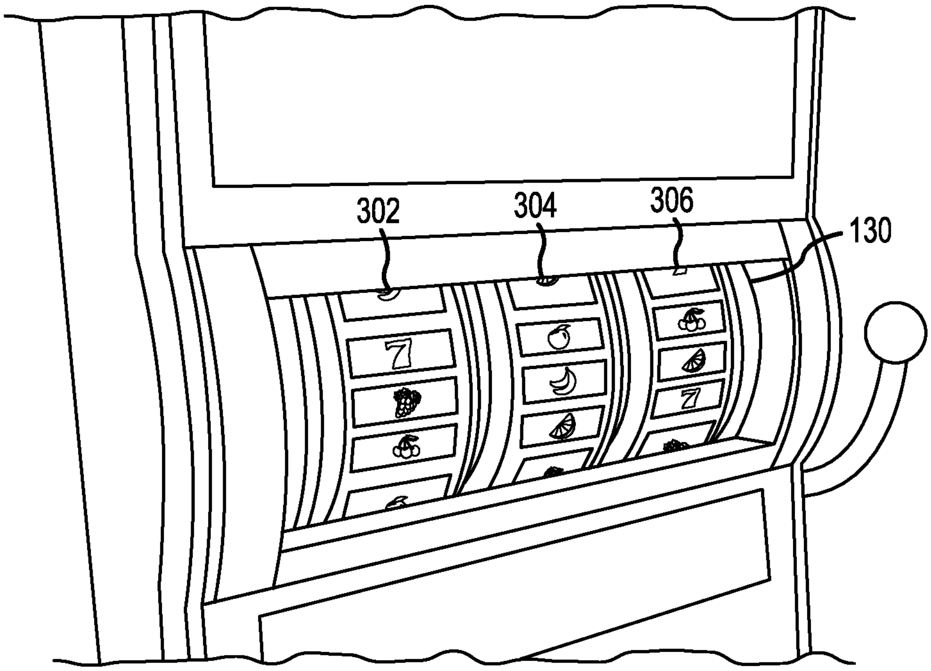
FIG. 7 is a perspective view of an electronic gaming machine, as shown at FIG. 1, in which a plurality of mechanical reels of the EGM are stopped in a first alignment or position.
Figure 8:
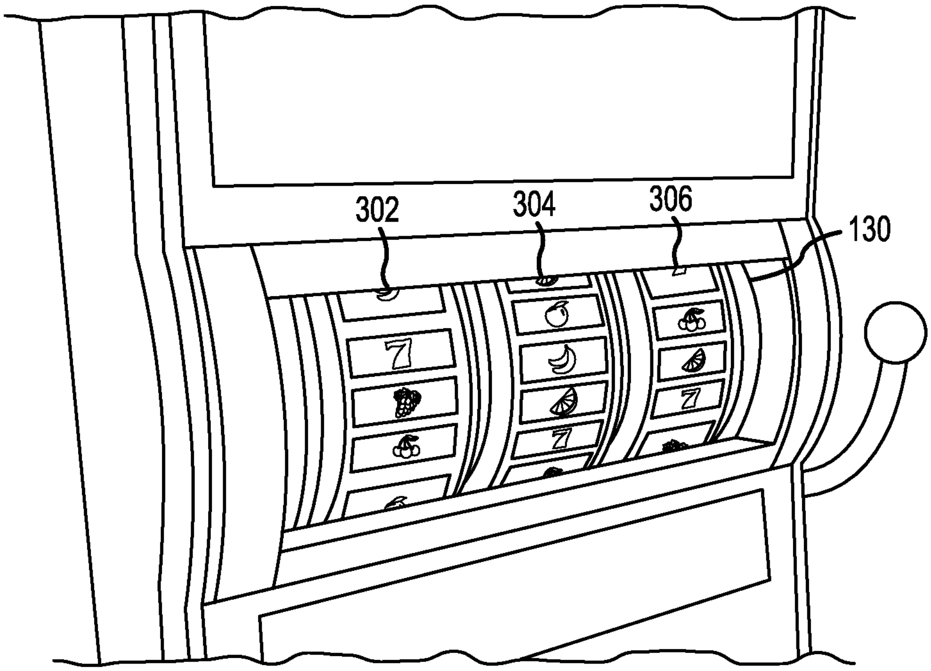
FIG. 8 is a perspective view of the electronic gaming machine, as shown at FIG. 1, during a feature game, in which a center reel of the plurality of mechanical reels in stopped in a second alignment or position, different from the first alignment or position, and in which the center reel includes an expanded number of active symbols.

FIG. 7 is a perspective view of an electronic gaming machine 104A-104X, as shown at FIG. 1, in which the plurality of mechanical reels 302-306 of an EGM 104A-104X are stopped in a first alignment or position, such as during a base game, as described above. FIG. 8 is a perspective view of the electronic gaming machine 104A-104X, in which center reel 304 of the plurality of mechanical reels 302-306 is stopped in a second alignment or stop position, different from the first alignment or stop position, and in which the center reel 304 includes an expanded number of active symbols.

As shown by these perspective views, during a feature or bonus game, a larger number of symbols may be displayed (e.g., as active symbols) from center reel 304. As a result, a number of pay lines (or "ways to win") may increase during the feature game, such as from 27 ways to win (e.g., 3*3*3, as described above) to 36 ways to win (e.g., 3*4*3). Likewise, during a feature game, a player may select a volatility option (as described above with reference to FIG. 5), whereby a number of free spins may vary during the feature game, and whereby the credit multipliers provided during the feature game may also vary according to a player selection.

Figure 9:
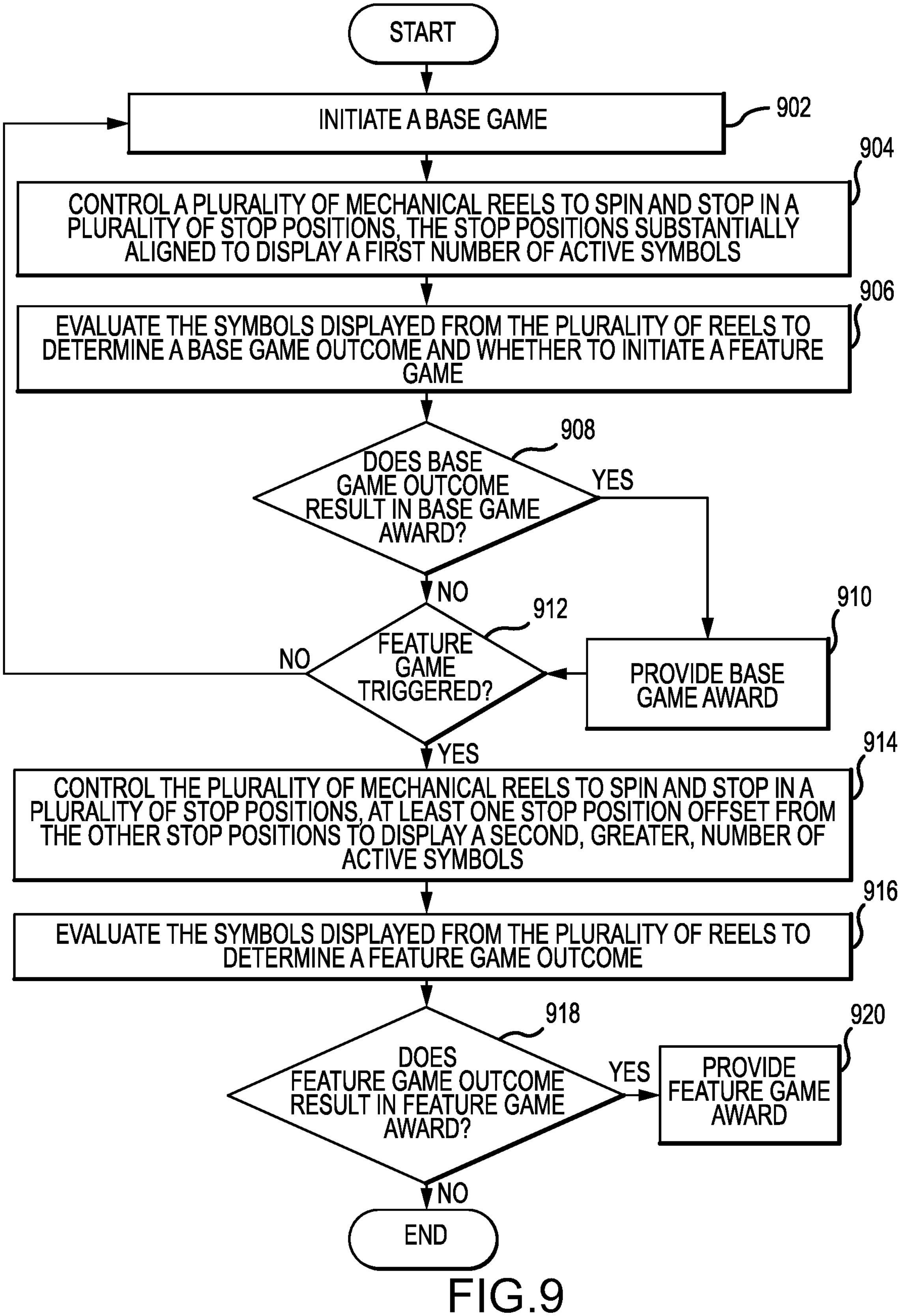
FIG. 9 is a flowchart illustrating a process for spinning and stopping a plurality of mechanical reels during a base game and during a feature game triggered from the base game.

FIG. 9 is a flowchart illustrating and generally summarizing a process 900 for spinning and stopping plurality of mechanical reels 130 during a base game and during a feature game triggered from the base game, as described above. Accordingly, in the exemplary embodiment, a base game may be initiated, such as, for example, in response to a player wager (step 902). During the base game, processor 204 may control reels 302-306 to spin and stop in a plurality of stop positions 308-312, where, during the base game, the stop positions selected by processor for each reel 302-306 are substantially aligned (step 904). For example, during the base game, each reel 302-306 may be stopped (e.g., using the stop position to stepper motor step position mapping described above) such that a center stop position (corresponding to symbols positions 3A, 3B, 3C) within a viewing window is substantially bisected by centerline 406.

Processor 204 may, in addition, evaluate the symbols displayed from reels 302-306 (e.g., the symbols displayed within the viewing window or illuminated) to determine a base game outcome (step 906). A base game outcome may be determined using a base game paytable. Specifically, the symbols displayed from reels 302-306 may be compared to winning symbol combinations defined by a base game paytable to determine whether to provide a base game award (step 908). If the base game outcome results in a base game award, the base game award may be provided to the player, such as by adding an amount associated with the base game award to a credit balance of the player (step 910).

Processor 204 may also evaluate the symbols displayed from reels 302-306 to determine whether to initiate a feature game (step 912). More particularly, to determine whether to trigger or initiate a feature game, processor 204 may, as described above, determine whether any BONUS symbol is displayed from reels 302-306. If a BONUS symbol (or another trigger combination or trigger symbol) is displayed, processor 204 may initiate the feature game.

In response to determining that the feature game should be initiated, processor 204 may control reels 302-306 to spin and stop on a plurality of stop positions 308-312, where at least one stop position 308-312 is vertically offset from at least one other stop position 308-312 (step 914). For example, during the feature game, each reel 302-306 may be stopped (e.g., using the stop position to stepper motor step position mapping described above) such that a center stop position of central reel 304 (corresponding to symbol positions 3B) aligns with centerline on one of its top or bottom edges, and such that the center stop position of central reel 304 is vertically offset from a center stop position (corresponding to symbol positions 3A and 3C) of adjacent reels 302 and 306.

Processor 204 may, in addition, evaluate the symbols displayed from reels 302-306 (e.g., the symbols displayed within the viewing window or illuminated) to determine a feature game outcome (step 916). A feature game outcome may be determined using a feature game paytable. Specifically, the symbols displayed from reels 302-306 may be compared to winning symbol combinations defined by a feature game paytable to determine whether to provide a feature game award (step 918). If the feature game outcome results in a feature game award, the feature game award may be provided to the player, such as by adding an amount associated with the feature game award to a credit balance of the player (step 920).

As described herein, reels 302-306 may be re-spun during the feature game a number of times corresponding to a player selected feature game option that specifies a number of free spins during the feature game. Once the player's free spins are exhausted, processor 204 may terminate play of the wagering game or return the player to the base game, depending, for example, upon whether the player has any credits remaining in his or her credit balance.

Technical effects or technical improvements of the expanded reel game, as described herein, thus include, at least, the following: (a) expanding a number of active symbols available for combination during a feature game to increase a number of ways to win (or pay lines) during the feature game; (b) stopping at least a center reel at a half step position from one or more other mechanical reels to expand the number of active symbols; and (c) providing a volatility selection in conjunction with the symbol expansion during the feature game.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a plurality of mechanical reels, each mechanical reel of the plurality of mechanical reels including a plurality of symbols, the gaming device presenting a visible portion of each of the mechanical reels of the plurality of mechanical reels after a spin;

a stepper motor configured to spin a first mechanical reel of the plurality of mechanical reels and to stop the first mechanical reel in a first plurality of stop positions, wherein, in each stop position of the first plurality of stop positions, a first number of complete symbol positions are visible within the visible portion of the first mechanical reel; and a processor configured to execute instructions stored on a memory, which, when executed, cause the processor to at least:

activate a reel expansion feature involving the first mechanical reel; and control the stepper motor, in response to activating the reel expansion feature, to stop the first mechanical reel at an offset stop position causing the presentation of a second number of complete symbol positions within the visible portion of the first mechanical reel, the second number of complete symbol positions including an additional complete symbol position, relative to the first number of complete symbol positions.

2. The gaming device of claim 1, wherein the instructions further cause the processor to determine to activate the reel expansion feature based on an output of a random number generator.

3. The gaming device of claim 1, wherein, when stopped in one of the stop positions of the first plurality of stop positions, a symbol of the first mechanical reel is aligned with a centerline of the visible portion, and wherein, when stopped in the offset stop position, symbols of the first mechanical reel are offset by a half position relative to the centerline.

4. The gaming device of claim 1, wherein the offset stop position is offset by a half step between a first stop position and a second stop position of the first plurality of stop positions.

5. The gaming device of claim 1 further comprising a backlight configured to illuminate at least a portion of the first mechanical reel when the first mechanical reel is stopped, wherein the instructions further cause the processor to control, in response to activating the reel expansion feature, the backlight to illuminate the second number of complete symbol positions.

6. The gaming device of claim 5, wherein the instructions further cause the processor to:

initiate a first spin of the first mechanical reel for a first play instance;

control the stepper motor to stop the first mechanical reel at first stop position of the first plurality of stop positions, causing the presentation of the first number of complete symbol positions within the visible portion of the first mechanical reel; and control the backlight to illuminate the first number of complete symbol positions, wherein the reel expansion feature is activated for a second spin of the first mechanical reel for a second play instance, and wherein controlling the backlight to illuminate the second number of complete symbol positions includes changing a setting of the backlight to illuminate a portion of the first mechanical reel that was unilluminated for the first play instance.

7. The gaming device of claim 1, wherein the instructions further cause the processor to:

generate a first random number generator (RNG) outcome for the first mechanical reel;

perform a lookup of a stepper motor stop position table using the first RNG outcome to identify the offset stop position; and determine to stop the stepper motor at the offset stop position based on the lookup.

8. The gaming device of claim 5, wherein the stepper motor stop position table defines a plurality of potential stop positions, the first plurality of stop positions and the offset stop position each being a subset of the plurality of potential stop positions.

9. The gaming device of claim 1, wherein controlling the first mechanical reel to stop at the offset stop position includes determining a step value halfway between a first step position associated with a first stop position of the first plurality of stop positions and a second step position associated with a second stop position of the first plurality of stop positions.

10. The gaming device of claim 1, wherein the instructions, when executed, further cause the processor to define a first number of pay-lines for evaluation against a paytable based upon the additional complete symbol position being presented within the visible portion.

11. The gaming device of claim 1, wherein determining to activate a reel expansion feature is performed upon activation of a feature game.

12. A method for presenting a wagering game on an electronic gaming device, the electronic gaming device including a plurality of mechanical reels, each mechanical reel of the plurality of mechanically reels including a plurality of symbols, the electronic gaming device further including a stepper motor configured to spin a first mechanical reel of the plurality of mechanical reels and to stop the first mechanical reel in a first plurality of stop positions, wherein, in each stop position of the first plurality of stop positions, a first number of complete symbol positions are visible within a visible portion of the first mechanical reel, the method comprising:

activating a reel expansion feature involving the first mechanical reel for a first spin;

controlling the stepper motor to initiate a spin of the first mechanical reel; and controlling the stepper motor, in response to activating the reel expansion feature, to stop the first mechanical reel at an offset stop position causing the presentation of a second number of complete symbol positions within the visible portion of the first mechanical reel, the second number of complete symbol positions including an additional complete symbol position, relative to the first number of complete symbol positions.

13. The method of claim 12 further comprising:

generating an output of a random number generator; and determining to activate the reel expansion feature based on the output of the random number generator.

14. The method of claim 12 wherein, when stopped in one of the stop positions of the first plurality of stop positions, a symbol of the first mechanical reel is aligned with a centerline of the visible portion, and wherein, when stopped in the offset stop position, symbols of the first mechanical reel are offset by a half position relative to the centerline.

15. The method of claim 12 wherein the electronic gaming device further includes a backlight, the method further comprising controlling the backlight, in response to activating the reel expansion feature, to illuminate the second number of complete symbol positions.

16. The method of claim 15 further comprising:

initiating a first spin of the first mechanical reel for a first play instance;

controlling the stepper motor to stop the first mechanical reel at first stop position of the first plurality of stop positions, causing the presentation of the first number of complete symbol positions within the visible portion of the first mechanical reel; and controlling the backlight to illuminate the first number of complete symbol positions, wherein the reel expansion feature is activated for a second spin of the first mechanical reel for a second play instance, and wherein controlling the backlight to illuminate the second number of complete symbol positions includes changing a setting of the backlight to illuminate a portion of the first mechanical reel that was unilluminated for the first play instance.

17. The method of claim 12 further comprising:

generating a first random number generator (RNG) outcome for the first mechanical reel;

performing a lookup of a stepper motor stop position table using the first RNG outcome to identify the offset stop position; and determining to stop the stepper motor at the offset stop position based on the lookup.

18. A non-transitory, computer-readable storage medium having instructions stored thereon, which when executed by a processor, cause the processor to at least:

control a stepper motor to spin a first mechanical reel for a first play instance on a gaming device, the gaming device having a plurality of mechanical reels that include the first mechanical reel, the gaming device configured to presenting a visible portion of each of the mechanical reels of the plurality of mechanical reels after a spin, wherein the stepper motor is configured to stop the first mechanical reel in a first plurality of stop positions and wherein, in each stop position of the first plurality of stop positions, a first number of complete symbol positions are visible within the visible portion of the first mechanical reel;

activate a reel expansion feature for the first mechanical reel to be implemented during the first play instance; and control the stepper motor, in response to activating the reel expansion feature, to stop the first mechanical reel at an offset stop position causing the presentation of a second number of complete symbol positions within the visible portion of the first mechanical reel, the second number of complete symbol positions including an additional complete symbol position, relative to the first number of complete symbol positions.

19. The non-transitory, computer-readable storage medium of claim 18, wherein the instructions further cause the processor to determine to activate the reel expansion feature based on an output of a random number generator.

20. The non-transitory, computer-readable storage medium of claim 18, wherein, when stopped in one of the stop positions of the first plurality of stop positions, a symbol of the first mechanical reel is aligned with a centerline of the visible portion, and wherein, when stopped in the offset stop position, symbols of the first mechanical reel are offset by a half position relative to the centerline.

* * * * *